US008852703B2

(12) United States Patent
Nahm et al.

(10) Patent No.: US 8,852,703 B2
(45) Date of Patent: Oct. 7, 2014

(54) LINERLESS LABEL MEDIA

(75) Inventors: Steven Nahm, Morristown, TN (US); Harold D. Blount, Morristown, TN (US); Jason L. Lence, Morristown, TN (US)

(73) Assignee: NCR Corporation, Duluth, GA (US)

( * ) Notice: Subject to any disclaimer, the term of this patent is extended or adjusted under 35 U.S.C. 154(b) by 124 days.

(21) Appl. No.: 13/327,153

(22) Filed: Dec. 15, 2011
(Under 37 CFR 1.47)

(65) Prior Publication Data

US 2013/0156986 A1 Jun. 20, 2013

(51) Int. Cl.

*B32B 9/00* (2006.01)
*B32B 33/00* (2006.01)
*B32B 7/12* (2006.01)

(52) U.S. Cl.

USPC ........ 428/40.1; 428/40.2; 428/41.8; 428/343; 428/352

(58) Field of Classification Search

USPC ............... 428/40.1, 40.2, 41.8, 343, 352, 354
See application file for complete search history.

(56) References Cited

U.S. PATENT DOCUMENTS

| | | | | | |
|---|---|---|---|---|---|
| 5,431,763 | A * | 7/1995 | Bradshaw | ..................... | 156/256 |
| 6,503,620 | B1 * | 1/2003 | Xie et al. | ..................... | 428/354 |
| 2007/0211135 | A1 * | 9/2007 | Moreland et al. | ............. | 347/221 |
| 2013/0156986 | A1 * | 6/2013 | Nahm et al. | .................... | 428/43 |

* cited by examiner

*Primary Examiner* — Patricia L Nordmeyer
(74) *Attorney, Agent, or Firm* — Michael Chan; Joseph P. Mehrle

(57) ABSTRACT

Linerless label media comprises a substrate, a thermally-sensitive coating, and an adhesive. The substrate has a front side and a back side opposite the front side. The thermally-sensitive coating is disposed on the front side of the substrate. The adhesive is disposed on a portion of the back side of the substrate. The adhesive may comprise emulsion polymer particles and high-aspect reinforcement particles dispersed within the emulsion polymer particles to provide a relatively high level of reinforcement per reinforcement particle. The adhesive may include a tapered surface interconnecting first and second adhesive edge surfaces which extend substantially parallel to a longitudinally-extending axis. The substrate may comprise a transparent material. The thermally-sensitive coating may comprise a clear material.

18 Claims, 4 Drawing Sheets

LINERLESS LABEL MEDIA

BACKGROUND

The present application relates to linerless label media, and is particularly directed to linerless label media in the form of individual linerless labels, rolls of linerless labels, or combined receipt and label rolls, for examples.

A known combined receipt and label roll 10 is shown in FIGS. 1 and 2. The combined roll 10 comprises a continuous web 12 of material wound in a spiral around a core 14. The web 12 includes a substrate 16 (FIG. 2) having a front side 18 and a back side 20 opposite the front side. A pattern of adhesive spots or strips 22 are disposed on the back side 20 of the substrate 16. The adhesive pattern 22 covers a relatively small portion of the back side 20, and extends along a longitudinal running axis 24 (FIG. 1) of the web 12.

A thermal-sensitive coating 26 is disposed on the front side 18 of the substrate 16. A release coating 28 is disposed on the thermal sensitive coating 26, and is also disposed on the front side 18 of the substrate layer 16. The release coating 28 prevents adhesive 22 on the back side 20 of the substrate 16 from sticking to the front side 18 when the web 12 is wound on the core 14. A longitudinal perforation 50 extends along a direction parallel to web axis 24. The longitudinal perforation 50 divides the web 12 into a first web portion 51 and a second web portion 52. The adhesive 22 is disposed on the first web portion 51. The second web portion 52 is substantially devoid of adhesive.

During use of the combined receipt and label roll 10 of FIGS. 1 and 2 in a direct thermal printer (not shown), the printer thermally images a portion of the thermal-sensitive coating layer 26 to provide receipt information on the thermally-imaged portion. A movable cutting blade of the printer then cuts the web 12 in cross-section to provide a combined receipt and label 30 as shown in FIG. 3. Alternatively, the web 12 may be cut in cross-section by a user manually tearing it against a stationary cutting blade of the printer to provide the combined receipt and label 30.

In an example use of the combined receipt and label 30 of FIG. 3, a retail merchant (such as a fast food restaurant) attaches the combined receipt and label 30 by way of the adhesive 22 to a purchased item (such as an order made by a retail customer in the fast food restaurant). The attached combined receipt and label 30 functions as a temporary label for the merchant to identify the order to be delivered to the particular customer. After the customer receives the order from the merchant, the customer removes the combined receipt and label 30, separates the first and second web portions 51, 52 at the perforation 50 (such as shown in FIG. 4), and keeps the second web portion as a permanent receipt of the order transaction.

A limitation of the combined receipt and label 30 shown in FIG. 3 is that the adhesive 22 may not provide sufficient adhesion to its intended surface of attachment, and is subject to falling off before reaching the customer. The adhesion force is typically less than 0.5 lbs/lineal inch of adhesive width. Another limitation is that the combined receipt and label 30 can cover up advertising graphics on an intended surface of attachment. As an example, the combined receipt and label 30 can cover up the retail merchant's name and/or logo which are on a coffee cup when the combined receipt and label is attached to the coffee cup. Yet another limitation of the known combined receipt and label 30 shown in FIG. 3 is its lack of durability and its tendency to either tear and/or absorb moisture in a fast food service environment. It would be desirable to provide a combined receipt and label in which such limitations are overcome.

SUMMARY

In accordance with one embodiment, linerless label media comprises a substrate, a thermally-sensitive coating, and an adhesive. The substrate has a front side and a back side opposite the front side. The thermally-sensitive coating is disposed on the front side of the substrate. The adhesive is disposed on a portion of the back side of the substrate. The adhesive comprises emulsion polymer particles and high-aspect reinforcement particles dispersed within the emulsion polymer particles to provide a relatively high level of reinforcement per reinforcement particle.

In accordance with another embodiment, linerless label media comprises a substrate, a thermally-sensitive coating, and an adhesive. The substrate has (i) a longitudinally-extending axis, (ii) a front side, and (iii) a back side opposite the front side. The thermally-sensitive coating is disposed on the front side of the substrate. The adhesive is disposed on a portion of the back side of the substrate. The adhesive includes a tapered surface interconnecting first and second adhesive edge surfaces which extend substantially parallel to the longitudinally-extending axis.

In accordance with yet another embodiment, linerless label media comprises a substrate, a thermally-sensitive coating, and an adhesive. The substrate has a front side and a back side opposite the front side. The substrate comprises a transparent material. The thermally-sensitive coating disposed on the front side of the substrate. The thermally-sensitive coating comprises a clear material. The adhesive is disposed on a portion of the back side of the substrate.

DETAILED DESCRIPTION

Figures 1, 2:
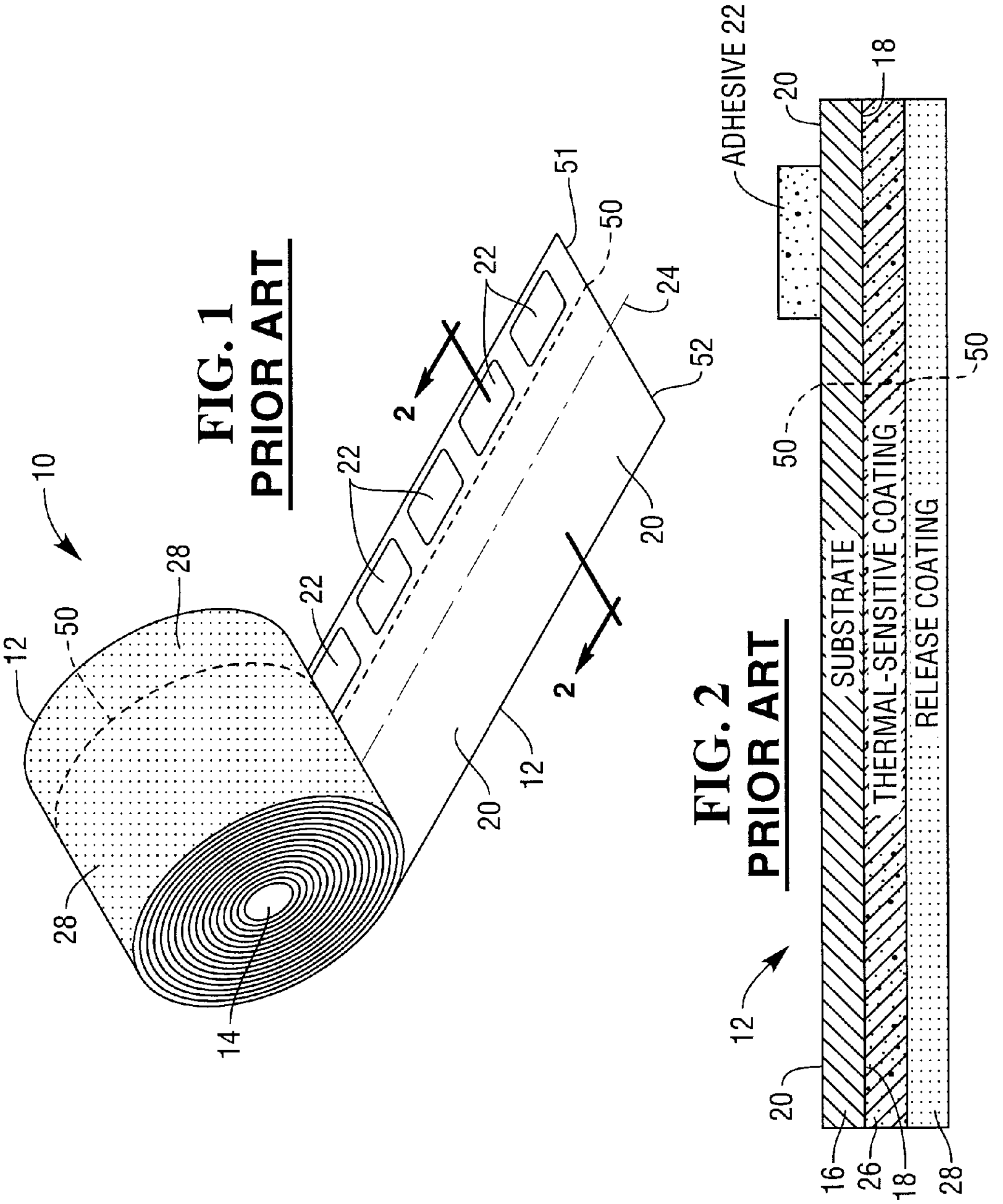
FIG. 1 PRIOR ART
FIG. 2 PRIOR ART
FIG. 1 is a perspective view of a known combined receipt and label roll.
FIG. 2 is a cross-sectional view, taken approximately along line 2-2 shown in FIG. 1 and showing layers of material of the known combined receipt and label roll.
Figure 3:
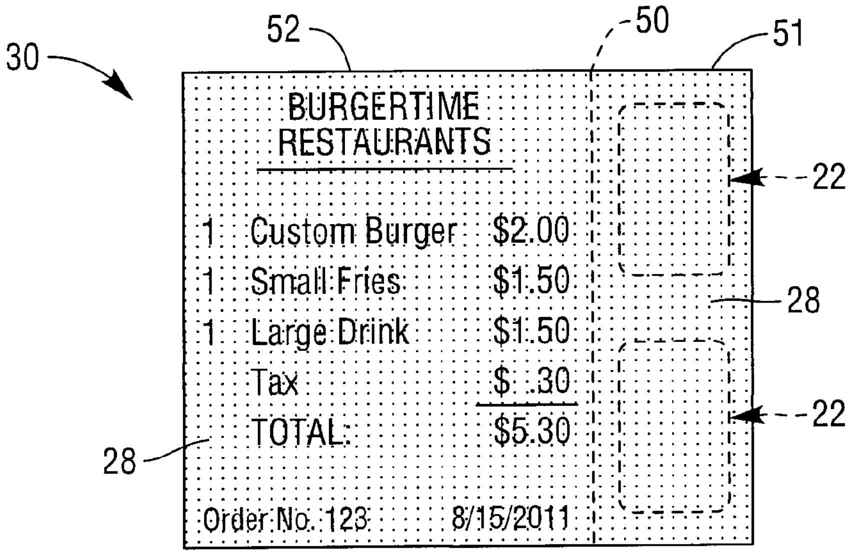
FIG. 3 PRIOR ART
FIG. 3 is a front view of a known combined receipt and label which has been cut from the combined receipt and label roll of FIGS. 1 and 2.
Figure 4:
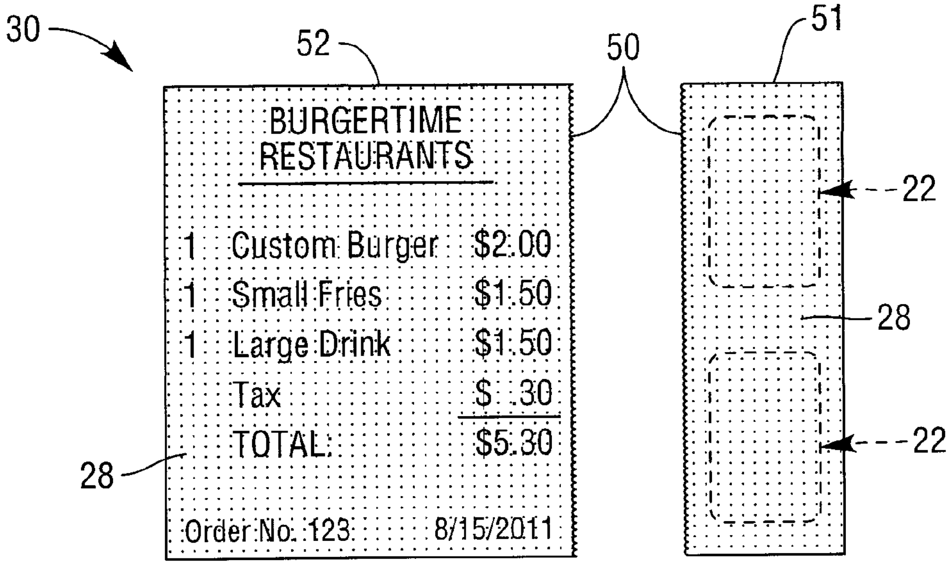
FIG. 4 PRIOR ART
FIG. 4 is a front view similar to FIG. 3, and showing the known combined receipt and label of FIG. 3 separated into two portions.
Figure 5:
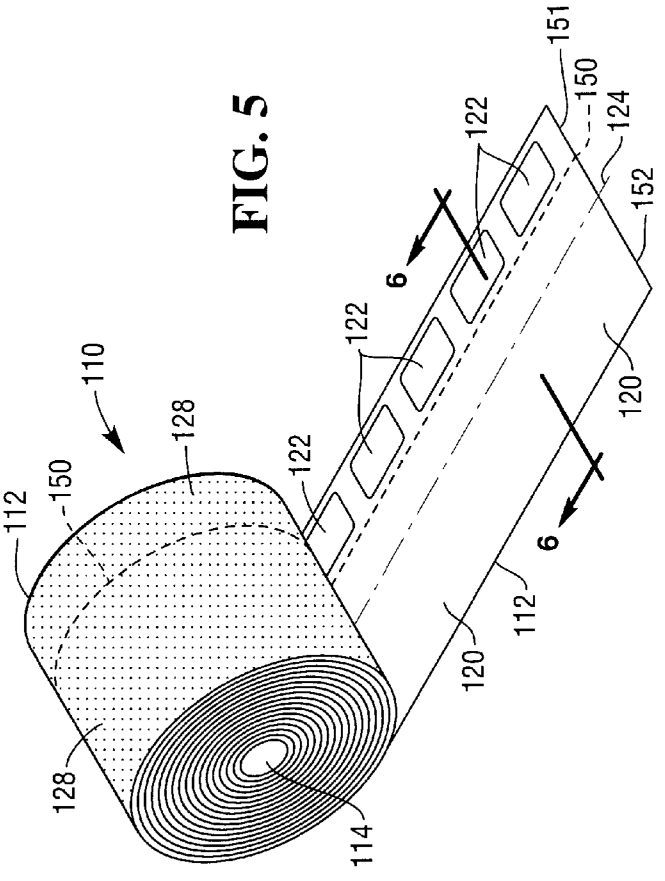
FIG. 5 is a perspective view similar to the perspective view of FIG. 1, and showing a combined receipt and label roll constructed in accordance with one embodiment.
Figure 6:
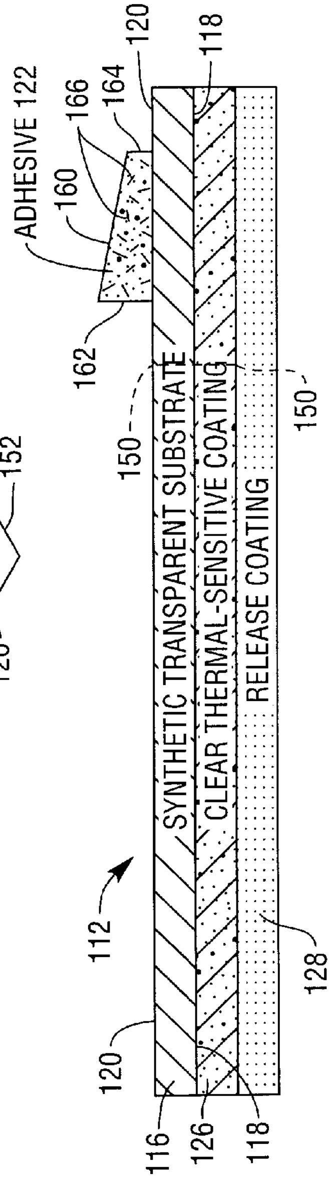
FIG. 6 is a cross-sectional view, taken approximately along line 6-6 shown in FIG. 5, and showing layers of material of the combined receipt and label roll.

Referring to FIGS. 5 and 6, example combined receipt and label roll 110 includes a web 112 of material having a longitudinally-extending axis 124 along a longitudinally-running direction of the web. The web 112 of material is wound on core 114 along web axis 124.

Web 112 includes a synthetic transparent substrate 116 having front side 118 and back side 120 opposite the front side. Synthetic transparent substrate 116 is more tear-resistant than paper substrates. A pattern of adhesive 122, in the form of spots or strips for example, is disposed on a portion of back side 120 of substrate 116 along web axis 124. The pattern of adhesive 122, as shown in FIG. 5, is only an example pattern. It is conceivable that other adhesive patterns, or any combination of adhesive patterns, may be used.

Each spot or strip of adhesive 122 (such as shown in FIG. 6) includes a tapered surface 160 which interconnects a first edge surface 162 and a second edge surface 164. First edge surface 162 and second edge surface 164 are substantially parallel to each other and to axis 124. First edge surface 162 is closer to axis 124 than second edge surface 164. First edge surface 162 has a relatively larger area than second edge surface 164 such that tapered surface 160 lies in a plane which is inclined relative to back side 120 of transparent substrate 116.

Tapered surface 160 of adhesive 122 provides a feathered-type of edge which allows for smoother winding of roll 112 onto core 114 during manufacture. The result is a smooth edge roll 110 which fits better when installed into a thermal printer such as a thermal printer in a point-of-sale terminal. Although tapered surface 160 is shown tapering "downwards" from axis 124 towards outer edge of roll 112, it is conceivable that tapered surface 160 be tapered "downwards" in the opposite direction from outer edge of roll 112 towards axis 124. It is also conceivable that each spot or strip of adhesive 122 has two tapered surfaces. For example, one tapered surface would taper downwards from axis 124 towards outer edge of roll 112, and the other tapered surface would taper downwards from outer edge of roll 112 towards axis 124 to form a cross-section of adhesive 122 which looks like cross-section of a road speed bump. Moreover, it is conceivable that each spot or strip of adhesive 122 has a tapered surface which extends around the perimeter of the adhesive.

Each spot or strip of adhesive 122 comprises an adhesive base material in which high-aspect reinforcement particles 166 have been added during manufacture of the adhesive 122. High-aspect reinforcement particles 166 comprise reinforcement particles in the shape of needles, fibers, platelets, or sheets, for examples. High-aspect reinforcement particles 166 are much larger in size than emulsion polymer particles of the adhesive base material. High aspect reinforcement particles 166 in adhesive 122 provide a three-dimensional reinforcement lattice which increases adhesive stiffness and reduces tack, as will be described in detail hereinbelow.

During manufacture of adhesive 122, high-aspect reinforcement particles 166 are post-added to an aqueous polymer emulsion of the adhesive base material. High-aspect reinforcement particles 166 become dispersed in the aqueous (continuous) phase between emulsion polymer particles to form a second dispersed phase. After application to back side 120 of transparent substrate 116 (FIG. 6), water evaporates from the modified emulsion and the dispersed-phase polymer particles move closer together and begin to coalesce to form a continuous film. As continuous film is being formed, high-aspect reinforcement particles 166 become trapped in spaces between emulsion polymer particles.

After drying, high-aspect reinforcement particles 166 are held in place within the film and remain where boundaries of the original polymer particles once were. As shown in FIG. 6, high-aspect reinforcement particles 166 are shown randomly dispersed throughout the spot or strip of adhesive 122. It is conceivable that the manufacturing process be modified so that high-aspect reinforcement particles 166 are not randomly dispersed, but rather oriented in a particular direction. As an example, high-aspect reinforcement particles 166 may be oriented to be parallel with back side 120 of transparent substrate 116. Adhesion strength of adhesive 122 is about 1.0 lbs/lineal inch of adhesive width to food packaging which has been coated with various grease hold-out materials such as wax, quilon, fluorocarbon, or light amounts of silicone.

Since size of high-aspect reinforcement particles 166 is much larger than emulsion polymer particles of the adhesive base material, the reinforcement particles can interact with many emulsion polymer particles to provide relatively higher levels of reinforcement on a per reinforcement particle basis. Also, since high-aspect reinforcement particles 166 are either one-dimensional (needles or fibers) or two-dimensional (platelets or sheets), the volume of reinforcement material need to achieve relatively higher levels of reinforcement is much lower than would be needed if low-aspect reinforcement particles (e.g., spherical-shaped particles) were used. Since the volume of reinforcement that can be added without stiffening the adhesive and reducing tack of the adhesive is limited, the reduced volume of reinforcement material as a result of using high-aspect reinforcement particles 166 (as described hereinabove) is desirable.

A clear thermally-sensitive coating 126 is disposed on an area covering front side 118 of transparent substrate 116. As an example, clear thermally-sensitive coating 126 may comprise facestock Model No. KPL5270 available from Kanzaki Specialty Papers located in Springfield, Mass. USA. Clear thermally-sensitive facestock 126 is more durable, more tear-resistant, and more moisture-resistant than known opaque thermally-sensitive facestock. Back of the clear thermally-sensitive coating 126 may be clear-colored for a "see through" effect.

Release coating 128 is disposed on front side 118 of transparent substrate 116 along web axis 124 to prevent adhesive 122 from sticking to front side 118 of substrate 116 when web 112 is wound on core 114. Release coating 128 may be disposed on the entire front side 118 of substrate 116 (such as shown in FIGS. 5 and 6), or on only a portion of front side 118 of substrate 116.

A longitudinal perforation 150 extends along a direction parallel to web axis 124. Longitudinal perforation 150 divides web 112 into a first web portion 151 and a second web portion 152. Adhesive 122 and release coating 128 are disposed on first web portion 151. Second web portion 152 is substantially devoid of adhesive.

Figure 7:
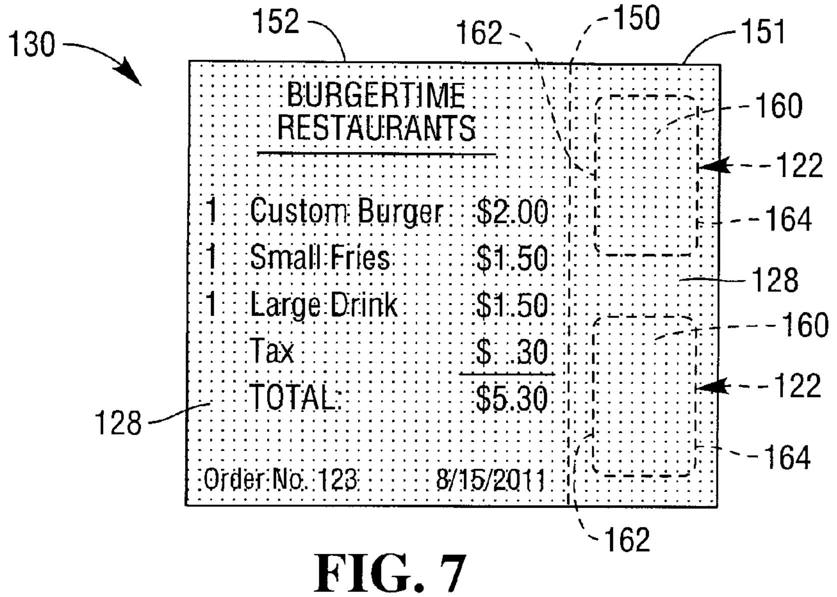
FIG. 7 is a front view similar to FIG. 3, and showing a combined receipt and label which has been cut from the combined receipt and label roll of FIGS. 5 and 6.

During use of example combined receipt and label roll 110 of FIGS. 5 and 6, a direct thermal printer (not shown) thermally images a portion of thermal-sensitive coating 126 to provide receipt information on the thermally-imaged portion. A movable cutting blade (also not shown) of the printer then cuts web 112 in cross-section to provide combined receipt and label 130 as shown in FIG. 7. Alternatively, web 112 may be cut in cross-section by a user (such as a retail merchant) manually tearing it against a stationary cutting blade of the printer to provide the combined receipt and label 130.

In an example use of the combined receipt and label 130 of FIG. 7, a retail merchant (such as a fast food restaurant) attaches combined receipt and label 130 by way of adhesive 122 to a purchased item (such as an order made by a retail customer in the fast food restaurant). The attached combined receipt and label 130 functions as a temporary label for the merchant to identify the order to be delivered to the particular customer. The combination of the transparent substrate 116 and the clear thermally-sensitive coating 126 allows the label 130 to be attached to a surface (such as a food bag or a coffee cup) without covering up graphics and artwork which may be present on the food bag or coffee cup. Graphics and artwork would be visible through transparent substrate 116 and clear coating 126. Accordingly, the label 130 is less noticeable, and the customer is still able see the receipt information as well as any graphics and artwork on the food bag or coffee cup as a whole.

Figure 8:
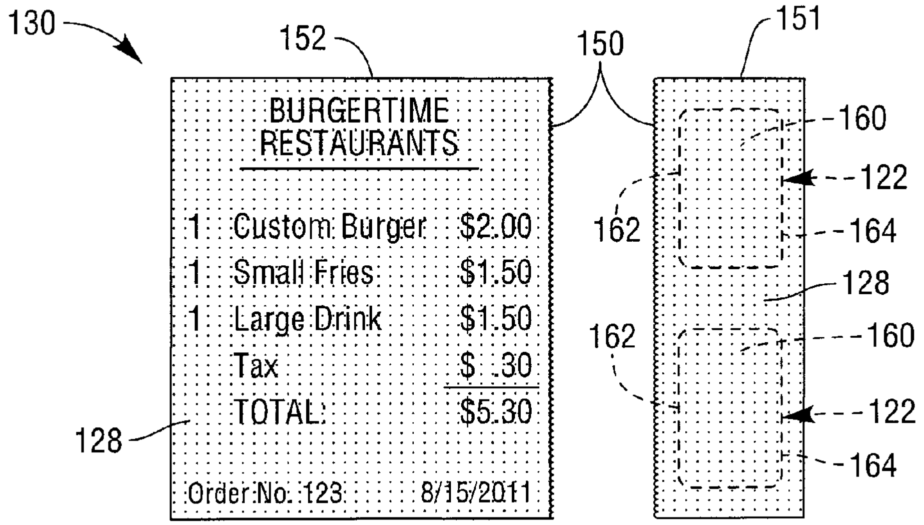
FIG. 8 is a front view similar to FIG. 4, and showing the combined receipt and label of FIG. 7 separated into two portions.

After the customer receives the order from the merchant, the customer manually tears combined receipt and label 130 along longitudinal perforation 150 to separate apart the first and second web portions 151, 152 of the combined receipt and label, as shown in FIG. 8. The customer keeps second web portion 152 of combined receipt and label 130 as a permanent receipt of the order transaction. The customer may leave first web portion 151 on the order. Alternatively, the customer may remove first web portion 151 from the order and discard it.

Although the above description describes combined receipt and label 130 having all features described, it is conceivable that the combined receipt and label may have any combination of the features. It is also conceivable that the above-described features be provided in labels which are other than combined receipt and labels. As an example, any combination of the above-described features may be provided in individual linerless labels. As another example, any combination of the above-identified features may be provided in a linerless label roll. Any size of labels and any size of rolls are possible.

Also, although the above description describes a more durable, a more tear-resistant, and a more moisture-resistant label used in a fast food service environment, it is conceivable that such improved labels may be used in other environments. These other environments may be harsher than a fast food service environment. As an example, labels may be used as baggage tags in a baggage transport environment. The baggage tags may be exposed to inclement weather and handling conditions rougher than in a fast food service environment.

While the present invention has been illustrated by the description of example processes and system components, and while the various processes and components have been described in detail, applicant does not intend to restrict or in any limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. Linerless label media comprising:

a substrate having a front side and a back side opposite the front side;

a thermally-sensitive coating disposed on the front side of the substrate; and adhesive disposed on a portion of the back side of the substrate, wherein the adhesive comprises emulsion polymer particles and reinforcement particles dispersed within the emulsion polymer particles, wherein the reinforcement particles are larger in one dimension than another and are larger than the emulsion polymer particles.

2. Linerless label media according to claim 1, wherein the high-aspect reinforcement particles comprise at least one of needles, fibers, platelets, and sheets.

3. Linerless label media according to claim 2, wherein the high-aspect reinforcement particles are trapped in spaces between the emulsion polymer particles.

4. Linerless label media according to claim 3, wherein (i) the substrate has a longitudinally-extending axis, and (ii) the adhesive includes a tapered surface interconnecting first and second adhesive edge surfaces which extend substantially parallel to the longitudinally-extending axis.

5. Linerless label media according to claim 3, wherein (i) the substrate comprises a transparent material, and (ii) the thermally-sensitive coating comprises a clear material.

6. Linerless label media according to claim 1, further comprising:

a core; and a web having a longitudinally-extending axis and wound on the core along the axis, the web including the substrate, the thermally-sensitive coating, the adhesive, and a release coating disposed on the front side of the substrate to prevent the adhesive from sticking to the front side of the substrate when the web is wound around the core.

7. Linerless label media according to claim 6, further comprising at least one longitudinal perforation extending along a direction parallel to the axis and dividing the web into a first web portion on which the adhesive and the release coating are disposed and a second web portion which is substantially devoid of adhesive.

8. Linerless label media comprising:

a substrate having (i) a longitudinally-extending axis, (ii) a front side, and (iii) a back side opposite the front side;

a thermally-sensitive coating disposed on the front side of the substrate; and adhesive disposed on a portion of the back side of the substrate, wherein the adhesive includes a tapered surface interconnecting first and second adhesive edge surfaces which extend substantially parallel to the longitudinally-extending axis, and wherein the adhesive comprises emulsion polymer particles and reinforcement particles dispersed within the emulsion polymer particles, wherein the reinforcement particles are larger in one dimension than another and are larger than the emulsion polymer particles.

9. Linerless label media according to claim 8, wherein the tapered surface tapers downwards from the first adhesive edge surface towards the second adhesive edge surface.

10. Linerless label media according to claim 9, wherein the first adhesive edge surface is located closer to the longitudinally-extending axis than the second adhesive edge surface.

11. Linerless label media according to claim 8, wherein (i) the substrate comprises a transparent material, and (ii) the thermally-sensitive coating comprises a clear material.

12. Linerless label media according to claim 8, further comprising:

a core; and a web wound on the core along the longitudinally-extending axis, the web including the substrate, the thermally-sensitive coating, the adhesive, and a release coating disposed on the front side of the substrate to prevent the adhesive from sticking to the front side of the substrate when the web is wound around the core.

13. Linerless label media according to claim 12, further comprising at least one longitudinal perforation extending along a direction parallel to the axis and dividing the web into a first web portion on which the adhesive and the release coating are disposed and a second web portion which is substantially devoid of adhesive.

14. Linerless label media comprising:

a pre-printed roll including a substrate having a front side and a back side opposite the front side, wherein the substrate comprises a transparent material;

a thermally-sensitive coating disposed on the front side of the substrate, wherein the thermally-sensitive coating comprises a clear material; and adhesive disposed on a portion of the back side of the substrate, and wherein the adhesive comprises emulsion polymer particles and reinforcement particles dispersed within the emulsion polymer particles, wherein the reinforcement particles are larger in one dimension than another are larger than the emulsion polymer particles.

15. Linerless label media according to claim 14, wherein clear material of the thermally-sensitive coating comprises a clear color for a transparent see through effect.

16. Linerless label media according to claim 14, wherein (i) the substrate has a longitudinally-extending axis, and (ii) the adhesive includes a tapered surface interconnecting first and second adhesive edge surfaces which extend substantially parallel to the longitudinally-extending axis.

17. Linerless label media according to claim 14, further comprising:

a core; and a web wound on the core along the longitudinally-extending axis, the web including the substrate, the thermally-sensitive coating, the adhesive, and a release coating disposed on the front side of the substrate to prevent the adhesive from sticking to the front side of the substrate when the web is wound around the core.

18. Linerless label media according to claim 17, further comprising at least one longitudinal perforation extending along a direction parallel to the axis and dividing the web into a first web portion on which the adhesive and the release coating are disposed and a second web portion which is substantially devoid of adhesive.

* * * * *